(12) United States Patent
Wright (10) Patent No.: US 9,317,138 B1
(45) Date of Patent: Apr. 19, 2016

(54) METHOD AND APPARATUS FOR SENSING MOVEMENT OF A HUMAN INTERFACE DEVICE

(75) Inventor: David Wright, San Diego, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 676 days.

(21) Appl. No.: 12/470,274

(22) Filed: May 21, 2009

Related U.S. Application Data (63) Continuation of application No. 10/875,561, filed on Jun. 23, 2004, now Pat. No. 7,864,157.

(60) Provisional application No. 60/483,092, filed on Jun. 27, 2003.

(51) Int. Cl.
*G06F 3/033* (2013.01)
*G06F 3/0346* (2013.01)

(52) U.S. Cl.
CPC .................................... *G06F 3/0346* (2013.01)

(58) Field of Classification Search
CPC ....... G06F 3/0346; G01S 17/50; G01S 17/87; G01S 13/584
USPC ........................... 345/156, 157, 159, 183, 184
See application file for complete search history.

(56) References Cited

U.S. PATENT DOCUMENTS

| | | | |
|---|---|---|---|
| 4,054,881 A | 10/1977 | Raab | |
| 4,754,268 A | 6/1988 | Mori | |
| 4,945,305 A | 7/1990 | Blood | |
| 4,988,981 A | 1/1991 | Zimmerman et al. | |
| 4,999,519 A | 3/1991 | Kitsukawa et al. | |
| 5,059,959 A | 10/1991 | Barry | |
| 5,126,759 A | 6/1992 | Small et al. | |
| 5,144,242 A | 9/1992 | Zeilenga et al. | |
| 5,264,856 A | 11/1993 | Thurlow | |
| 5,565,887 A | 10/1996 | McCambridge et al. | |
| 5,668,550 A | 9/1997 | Coleman, Jr. | |
| 5,734,272 A | 3/1998 | Belot et al. | |
| 5,757,298 A | 5/1998 | Manley et al. | |
| 5,874,918 A * | 2/1999 | Czarnecki et al. | 342/417 |
| 5,923,757 A | 7/1999 | Hocker et al. | |
| 5,973,618 A * | 10/1999 | Ellis | 340/990 |
| 6,031,366 A | 2/2000 | Mitsuishi | |
| 6,067,041 A * | 5/2000 | Kaiser et al. | 342/171 |
| 6,310,568 B1 | 10/2001 | Kurooka | |
| 6,356,210 B1 * | 3/2002 | Ellis | 340/990 |
| 6,594,367 B1 * | 7/2003 | Marash et al. | 381/92 |

(Continued)

FOREIGN PATENT DOCUMENTS

WO 03003290 A 1/2003

OTHER PUBLICATIONS

U.S. Appl. No. 10/875,561 "Method and apparatus for sensing movement of a human interface device," Wright; 35 pages.

(Continued)

*Primary Examiner* — Calvin C Ma (57) ABSTRACT

A system includes circuitry to exchange multiple radio signals with a peripheral device. The system further includes a processing device configured to identify time periods for the multiple radio signals to travel between the circuitry and the peripheral device, wherein the processing device is configured to determine a distance and direction of movement of the peripheral device according to the identified time periods.

20 Claims, 8 Drawing Sheets

(56) References Cited

U.S. PATENT DOCUMENTS

| | | | |
|---|---|---|---|
| 6,600,480 B2* | 7/2003 | Natoli | 345/168 |
| 6,720,876 B1* | 4/2004 | Burgess | 340/568.1 |
| 6,850,227 B2 | 2/2005 | Takahashi et al. | |
| 7,026,992 B1* | 4/2006 | Hunt et al. | 342/465 |
| 7,050,798 B2 | 5/2006 | Ranta | |
| 7,325,723 B2 | 2/2008 | Desjeux | |
| 7,346,120 B2* | 3/2008 | McCorkle | 375/295 |
| 7,446,657 B2* | 11/2008 | Shaffer et al. | 340/539.26 |
| 7,499,020 B2 | 3/2009 | Kurashima et al. | |
| 2002/0033803 A1* | 3/2002 | Holzrichter et al. | 345/158 |
| 2002/0057254 A1 | 5/2002 | Kurashima et al. | |
| 2003/0060218 A1 | 3/2003 | Billerbeck et al. | |
| 2003/0080944 A1 | 5/2003 | Takahashi et al. | |
| 2003/0210832 A1* | 11/2003 | Benton | 382/284 |
| 2004/0113890 A1 | 6/2004 | Ranta | |
| 2004/0169638 A1 | 9/2004 | Kaplan | |
| 2008/0158165 A1* | 7/2008 | Geaghan et al. | 345/173 |

OTHER PUBLICATIONS

USPTO Non-Final Rejection for U.S. Appl. No. 10/875,561 dated Jun. 20, 2007; 16 pages.

USPTO Non-Final Rejection for U.S. Appl. No. 10/875,561 dated Nov. 15, 2007; 16 pages.

USPTO Non-Final Rejection for U.S. Appl. No. 10/875,561 dated Apr. 1, 2008; 8 pages.

USPTO Non-Final Rejection for U.S. Appl. No. 10/875,561 dated Oct. 29, 2008; 8 pages.

USPTO Final Rejection for U.S. Appl. No. 10/875,561 dated May 12, 2009; 7 pages.

U.S. Appl. No. 09/924,734, Programmable Microcontroller Architecture (Mixed Analog/Digital), Aug. 7, 2001; 27 pages.

U.S. Appl. No. 13/328,385: "PSOC Architecture," Warren Snyder, filed Dec. 16, 2011; 19 pages.

USPTO Advisory Action for U.S. Appl. No. 10/875,561 dated Jun. 4, 2010; 3 pages.

USPTO Final Rejection for U.S. Appl. No. 10/875,561 dated Mar. 12, 2010; 8 pages.

USPTO Final Rejection for U.S. Appl. No. 10/875,561 dated Nov. 15, 2007; 16 pages.

USPTO Non-Final Rejection for U.S. Appl. No. 10/875,561 dated Sep. 2, 2009; 7 pages.

USPTO Non-Final Rejection for U.S. Appl. No. 13/328,962 dated Jun. 26, 2012; 11 pages.

USPTO Notice of Allowance for U.S. Appl. No. 09/943,062 dated Apr. 5, 2011; 5 pages.

USPTO Notice of Allowance for U.S. Appl. No. 09/943,062 dated Jul. 21, 2011; 5 pages.

USPTO Notice of Allowance for Application No. 09/943,062 dated Nov. 2, 2011; 5 pages.

USPTO Notice of Allowance for U.S. Appl. No. 09/943,062 dated Dec. 1, 2010; 4 pages.

USPTO Notice of Allowance for Application No. 10/001,478 dated Feb. 17, 2012; 7 pages.

USPTO Notice of Allowance for U.S. Appl. No. 11/799,439 dated Jun. 1, 2010; 4 pages.

USPTO Notice of Allowance for U.S. Appl. No. 11/799,439 dated Sep. 13, 2010; 4 pages.

USPTO Notice of Allowance for U.S. Appl. No. 11/799,439 dated Oct. 13, 2009; 4 pages.

USPTO Notice of Allowance for U.S. Appl. No. 10/875,561 dated Jul. 29, 2010; 4 pages.

\* cited by examiner

METHOD AND APPARATUS FOR SENSING MOVEMENT OF A HUMAN INTERFACE DEVICE

RELATED APPLICATIONS

This application is a continuation of and claims priority to pending U.S. patent application Ser. No. 10/875,561, filed Jun. 23, 2004, which claims priority to U.S. Provisional Patent Application No. 60/483,092, filed on Jun. 27, 2003.

TECHNICAL FIELD

The present disclosure relates generally to human interface devices and in particular to pointing devices.

BACKGROUND

Conventional pointing devices, such as computer mice, sense motion by using opto-mechanical sensing of the motion of a ball in contact with a surface over which the mouse is being moved. The ball is situated in a cavity, and is free to rotate as the mouse is moved. The ball is also in contact with a pair of orthogonally positioned rollers, which are coupled with slotted disks. Rotation of the disks is detected optically by a Light Emitting Diode (LED) and a pair of photo detectors.

One drawback to this roller ball design is the tendency for the rollers to collect dust and dirt. This results in slippage between the ball and rollers causing unreliable motion detection. For this reason, in recent years mice have moved to direct optical sensing where the motion of the mouse is sensed relative to the surface over which it is being moved. Typically, an optical mouse has an optical sensor, similar to a low resolution camera that views the surface where the mouse is being moved. The surface is illuminated by an LED. The sensor takes pictures of the surface, detecting microscopic variations in even an apparently smooth surface. Successive frames of the surface image are compared, and motion inferred from the changes in surface features between images.

Recently, there has also been a growing market for wireless mice. Users are inconvenienced by the wire that traditionally connects the mouse to a Personal Computer (PC), and the limited freedom of movement caused by the wire. The battery life of wireless optical mice typically varies between a few weeks and a couple of months. The wireless mouse battery life is acceptable for many home users, but has resulted in limited adoption in office environments. This is partially due to Information Technology (IT) managers not wanting to continuously change mouse batteries. The greatest power drain in optical mice is generally the optical subsystem that includes both the power drawn by the LED that illuminates the mouse contact surface and the current consumption of the optical sensor.

In wired or wireless mice, the optical sensors and associated components significantly increase the cost over mice that use roller balls. In summary, wireless mice have short battery life due to the current consumption of the optical sensor and subsystem and are relatively expensive due to the cost of both the optical and wireless subsystems.

DETAILED DESCRIPTION

Figure 1:
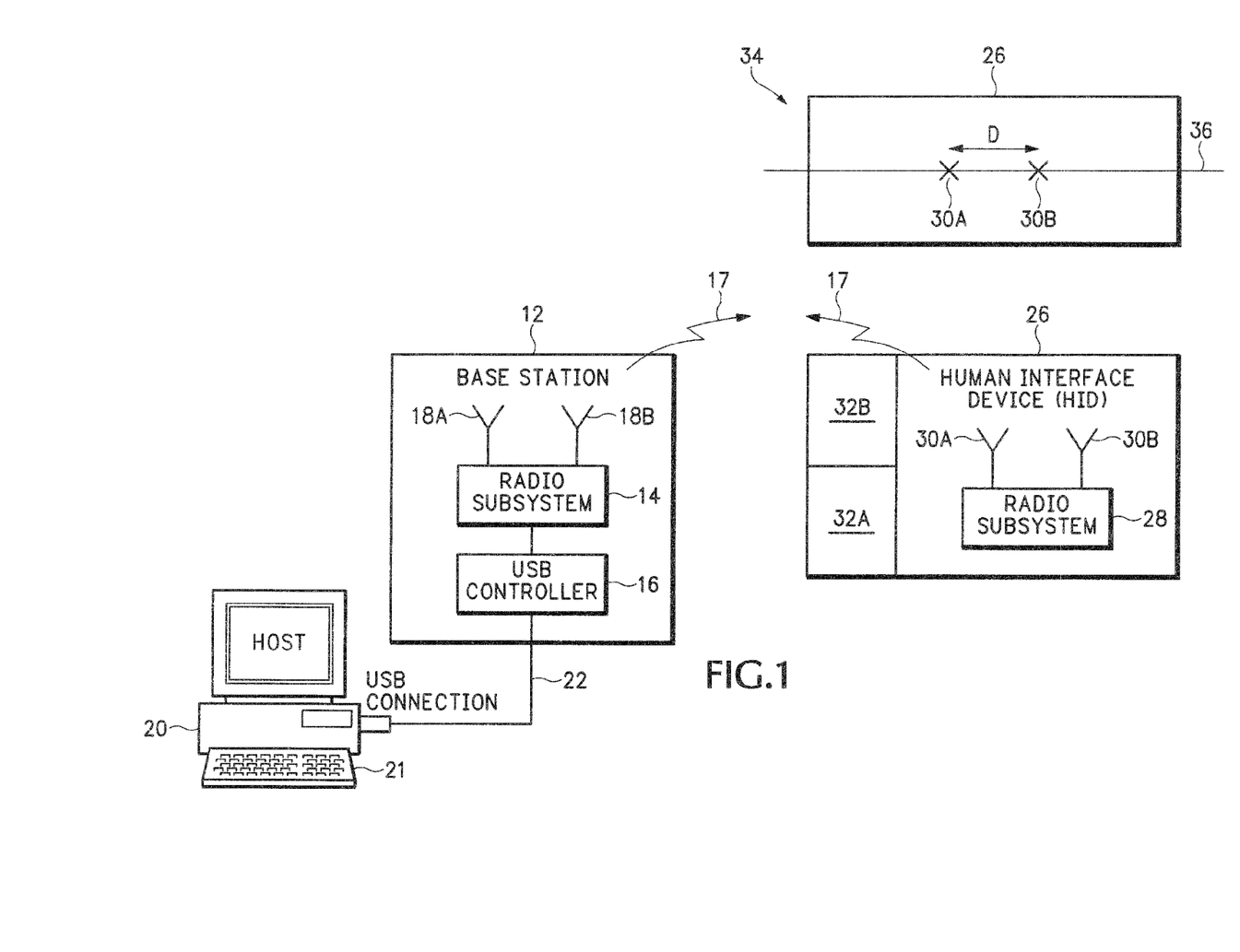
FIG. 1 is a first embodiment of a radio based wireless pointing device.

FIG. 1 shows how movement of a Human Interface Device (HID) 26 is sensed using electromagnetic signals 17. Movements of the HID 26 are detected according to an amount of time for the electromagnetic signals 17 to return back from the HID 26 to a base station 12. In one embodiment, the electromagnetic signals 17 are radio frequency (RF) waves carrying one or more pulses that are sent by multiple antennas 18A and 18B in the base station 12 and returned back from multiple antennas 30A and 30B in the HID 26.

In one example, the HID 26 is a pointing device that includes a radio subsystem 28 and selection buttons 32A and 32B. In one embodiment, the pointing device 26 is a computer mouse. However, the HID 26 can be any other type of wireless peripheral device that uses position information wirelessly communicated to a host computer 20. For example, the HID 26 can be a game controller or any other type of remote control device where the motion of the device is detected using electromagnetic waves. However, for explanation purposes below, the HID 26 may be referred to as a pointing device.

The base station 12 includes a radio subsystem 14 that is connected to a host computer 20, such as a Personal Computer (PC). In one embodiment, the base station 12 includes a USB controller 16 that converts information from radio subsystem 14 into USB signals that are sent to a host computer 20 over USB connection 22. In other embodiments, the base station 12 does not have to be connected to the host 20 through a USB connection 22 and can alternately be connected to the host 20 through any type of conventional PC or mouse interface. In another embodiment, the base station 12 may be integrated into the host computer 20.

In this example, the radio subsystem 14 has two antennas 18A and 18B and the radio subsystem 28 has two antennas 30A and 30B. In a top view 34, the antennas 30A and 30B are spaced apart a known distance D and located along a center line 36 of the pointing device 26. It is not necessary that the antennas 18A and 18B in the base station 12 are located along any particular axis but, in some embodiments, they may be reasonably well spaced apart.

Figure 2:
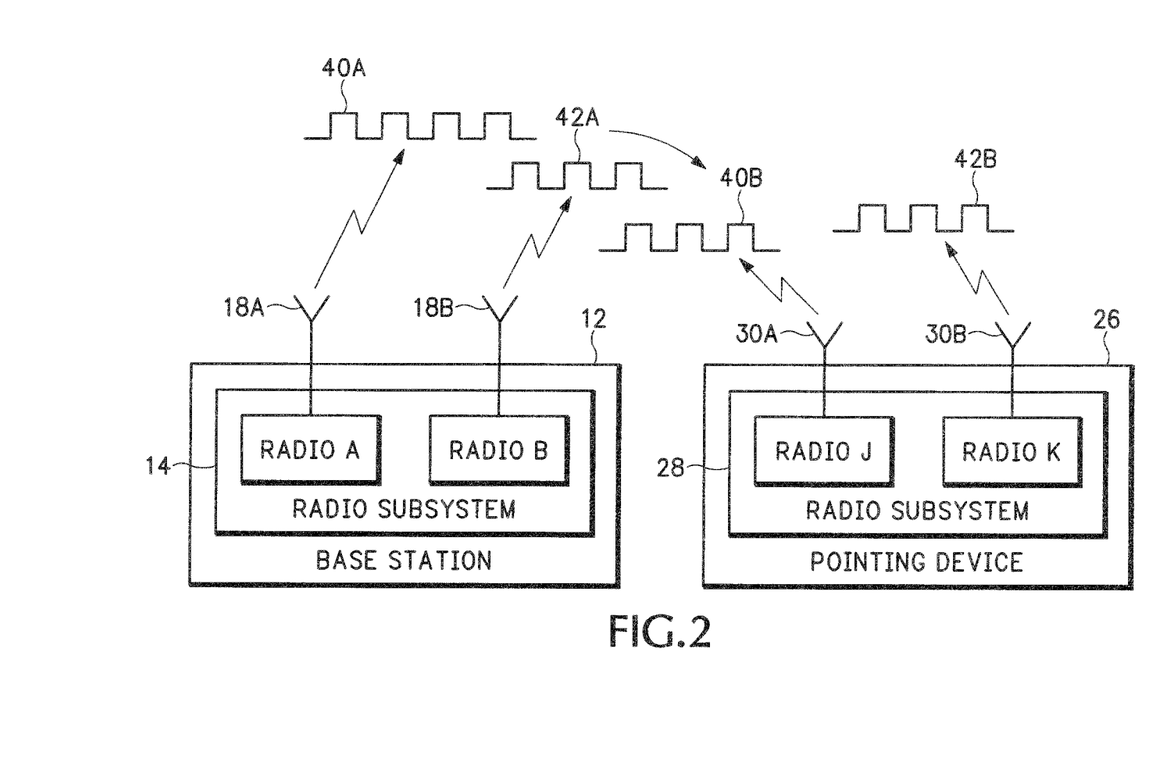
FIG. 2 is a diagram showing a 'ping-pong' communication between a base station and the wireless pointing device, according to an embodiment.

FIG. 2 shows the four antennas 18A, 18B, 30A and 30B all located in approximately the same plane of pointing device movement. A radio A in the radio subsystem 14 communicates with a radio J in the pointing device radio subsystem 28 through antennas 18A and 30A, respectively. A radio B in the radio subsystem 14 communicates with a radio K in the pointing device radio subsystem 28 using antennas 18B and 30B, respectively. The radio pairs AJ and BK may use different radio frequencies in order to prevent interference.

Radio A sends RF pulses or short bursts of pulses 40A on a particular Radio Frequency (RF) to radio J. When the pulse or burst of pulses 40A are received at the given RF frequency, radio J retransmits the pulse or burst of pulses 40B back to radio A. Radio A then retransmits the pulse or burst 40A back to radio J. Radios B and K conduct a similar ping-pong operation with radio B sending pulses or burst of pulses 42A to radio K at a second RF frequency and radio K then sends the pulses or burst of pulses 42B back to radio B. In one example, the RF frequency of signal 42A is half the RF frequency of radio B.

Figure 3:
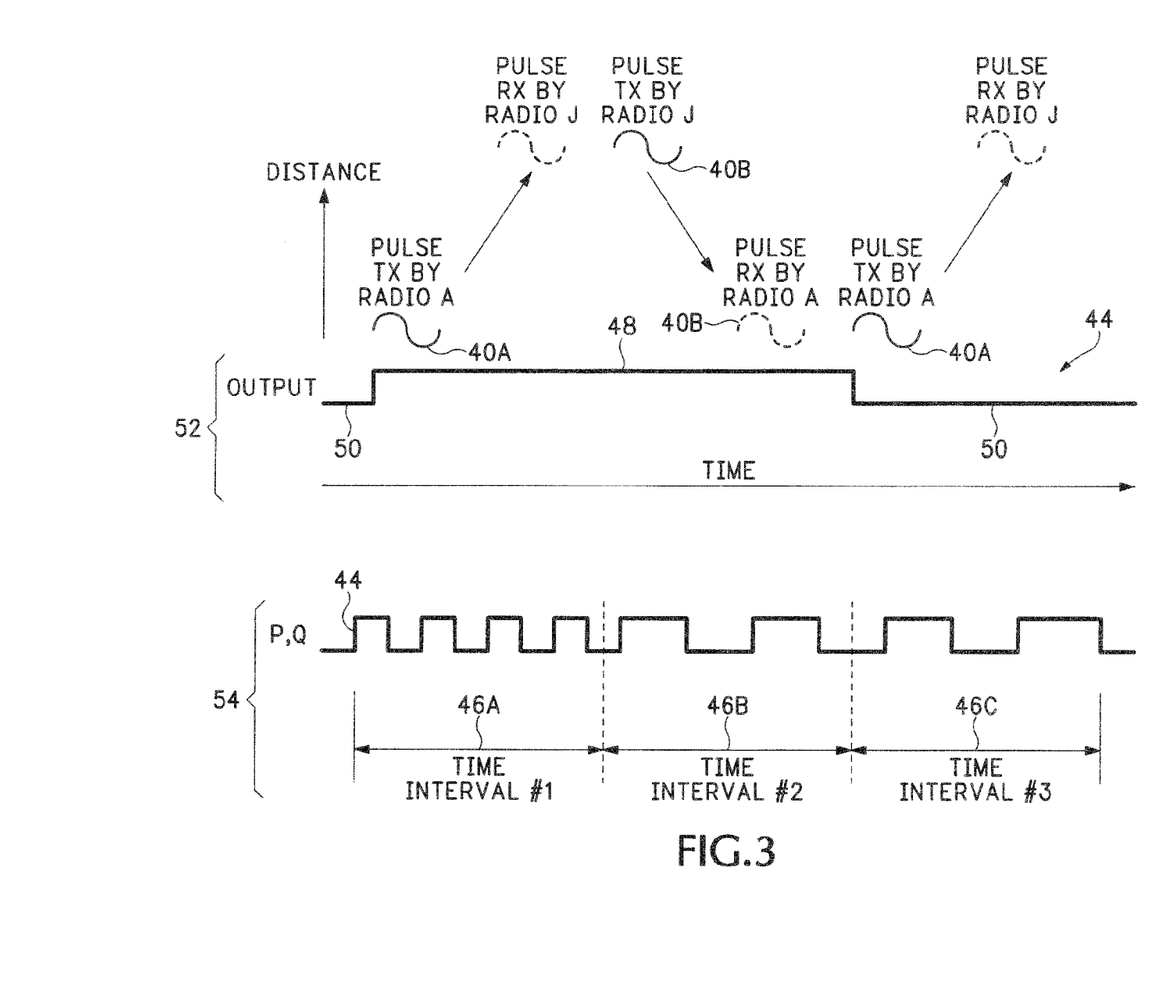
FIG. 3 shows how an output signal is generated from the communications shown in FIG. 2, according to an embodiment.

Referring to FIGS. 2 and 3, radio A retransmits a pulse 40A every time a pulse is received back from radio J. Or in other words, radio A transmits the pulses 40A at a Pulse Repetition Frequency (PRF) a function of to the return rate of pulses 40B. Radio A or a processor in the base station 12 generates an output signal 44 by inverting a logic state each time another pulse 40A is transmitted. The frequency of the output signal 44 is therefore half the PRF. Since the time of travel for pulses 40A and 40B is a function of the distance between radios A and J (plus a constant), the frequency of the output signal 44 is a function of the distance between radios A and J.

Radio A continues to transmit pulses at a Pulse Repetition Frequency (PRF) that is a function of to the time of travel of the radio waves between the two devices 12 and 26, plus a constant delay corresponding to the time used by the base station 12 and the pointing device 26 to receive and retransmit the pulses 40. A similar output signal 44 is generated for the pulses 42A and 42B in FIG. 2 ping-ponged back and forth between radio B and radio K.

The pointing device 26, such as a mouse, is an incremental device in which changes in position, rather than absolute position, is the quantity being measured. Also, the direction of movement is measured relative to the current position of the pointing device, rather than relative to the base station 12, the computer 20 (FIG. 1) connected to the base station 12, or any other fixed point. Therefore, incremental movements of pointing device 26 may be detected by measuring changes in the frequencies of the output signals 44, and the accuracy of the measurements are unaffected by time delays that may differ as a result of manufacturing variations, such as the processing time to receive and retransmit pulses 40 and 42.

The frequency of output signal 44 is a function of the distance between radios A and J. The total delay time for the pulses 40A and 40B can include the sum of the response time of radio A (the time between the start of transmission of the pulse 40A and the start of reception of the transmitted pulse 40B), the response time of radio J, and the time taken for the pulses 40A and 40B to travel between the antennas 18A and 30A. These constants may be features of the radio implementation, and so the distance A-J (Daj) can be accurately calculated for any given system according to the frequencies of output signal 44.

Similarly, the second output signal 44 generated for the pulses 42A and 42B transmitted between radios B and K has a frequency which is a function of the distance B-K ($D_{bk}$) between antenna 18B and antenna 30B.

Referring specifically to timing diagram 52 in FIG. 3, pulses 40A and 40B are sent back and forth between radio A and radio J. However, this is only one example and there may be a train of pulses that are sent back and forth between the radios, such as shown in FIG. 2. Radio subsystem 14 (FIG. 2) changes the logic state of the output signal 44 whenever another pulse signal 40A is sent to radio J. The output signal 44 changes to a high logic state 48 when it initially sends out pulse 40A and remains in the high logic state 48 until it receives pulse 40B back from radio J. The radio subsystem 14 upon receiving returned pulse 40B changes the output signal 44 to a low logic state 50 when a next pulse 40A is sent to radio J. The output signal 44 changes from the low logic state 50 to another logic high state when the pulse 40B is received back from radio J and the next pulse 40A is transmitted. This process is continuously repeated over successive timing intervals.

Timing diagram 54 shows several timing intervals 46 for the output signal 44. During a first timing interval 46A, the logic state for the output signal 44 changes eight times. This represents radio A sending pulse 40A and receiving back pulse 40B eight times during the time interval 46A. In the time intervals 46B and 46C the logic state for the output signal 44 changes four times. This represents radio A sending pulse 40A and receiving back the pulse 40B four times during the time interval 46A.

The eight logic state changes in time interval 46A is associated with a particular distance between antenna 18A in radio A and antenna 30A in radio J. The lower number of four logic states in time interval 46B indicates antenna 30A has moved a farther distance from antenna 18A. The same four logic states in time interval 46C indicates that antenna 30A has remained at substantially the same distance from antenna 18A during both time interval 46B and 46C.

Movements of the pointing device 26 are inferred according to the number of logic state changes, or changes in frequency, of the output signal 44 relative to each successive time interval 46. If the frequency of output signal 44 increases for a particular time interval 46, then the associated antenna in the pointing device 26 has moved closer to the associated antenna in the base station 12. If the frequency of output signal 44 decreases for a particular time interval 46, then the associated antenna in the pointing device 26 has moved farther away from the associated antenna in the base station 12. Thus, the change in frequency of the output signal 44 is a function of the change in distance between the antennas 18 and 30 in the base station 12 and pointing device 26, respectively.

Figure 4:
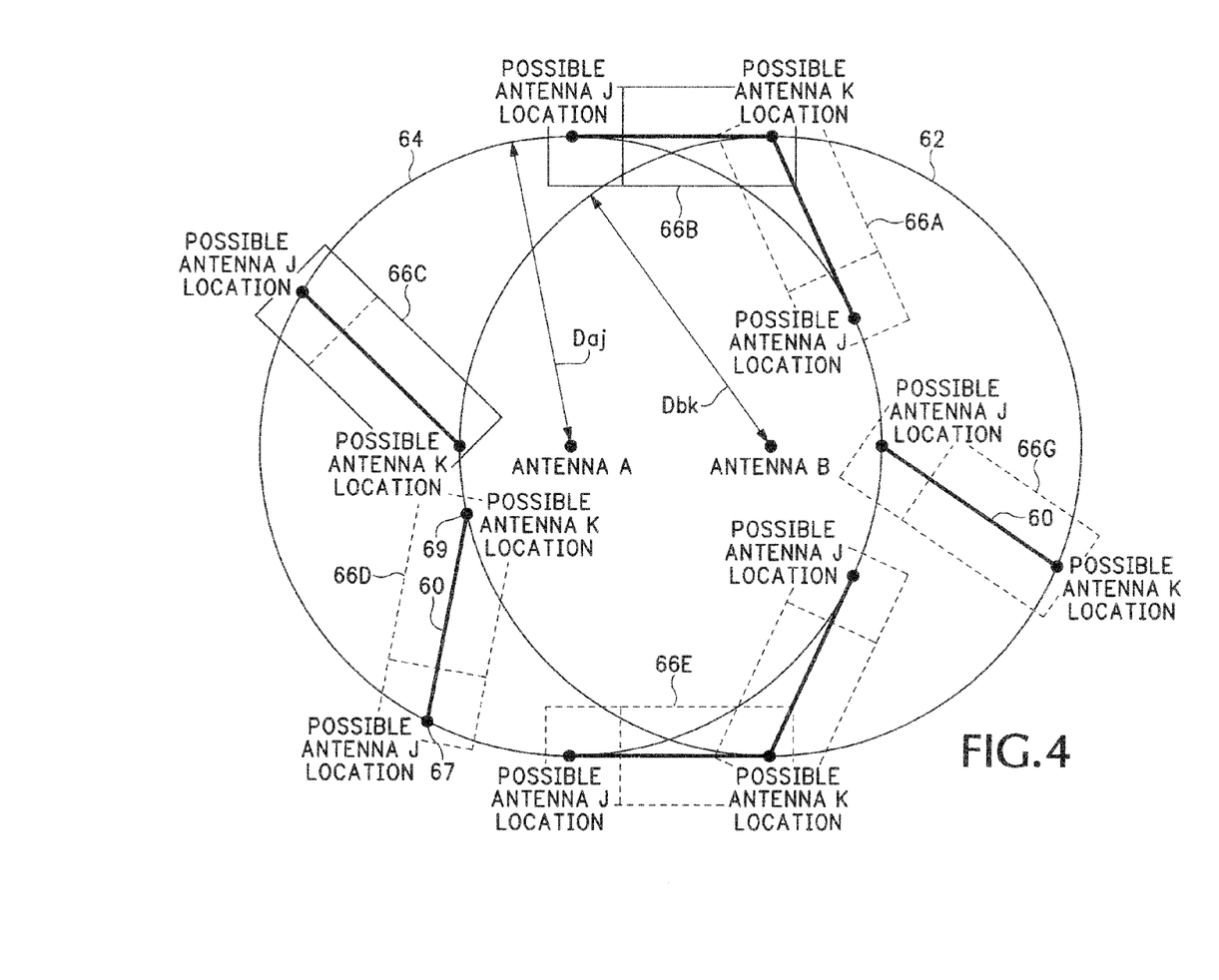
FIG. 4 shows the range of mouse locations which may be inferred using a single pair of distance measurements, according to an embodiment.

FIG. 4 shows how the positions of the pointing device 26 are identified using a pair of antennas in the base station 12 and a pair of antennas in the pointing device 26. The points J, such as at location 67 refer to possible locations of the J antenna derived from the frequency of the first output signal 44 associated with the pulse transmission 40 in FIG. 2. Similarly, points K, such as at location 69, refer to the possible locations of the antenna K derived from the frequency of a second output signal 44 associated with the pulse transmission 42 in FIG. 2. The dark lines 60 refer to a fixed known distance Djk between the two antennas 30A and 30B on the pointing device 26 as shown by distance D in FIG. 1.

From the detected frequencies of the two output signals 44 derived from pulse signals 40 and 42, it is possible to infer that the pointing device 26 is located/orientated on a locus for which the line 60 of length Djk links the circumferences of two circles 62 and 64 of radii Daj and Dbk. The radius Daj is the calculated distance between radio A and radio J and the radius Dbk is the calculated distance between radio B and radio K.

As shown in FIG. 4, simply sending two signals to two different antennas and measuring the frequency of the returned pulse(s) only identifies the two circles 62 and 64. This still leaves a large number of possible positions 66A-66G for the pointing device 26.

Figure 5:
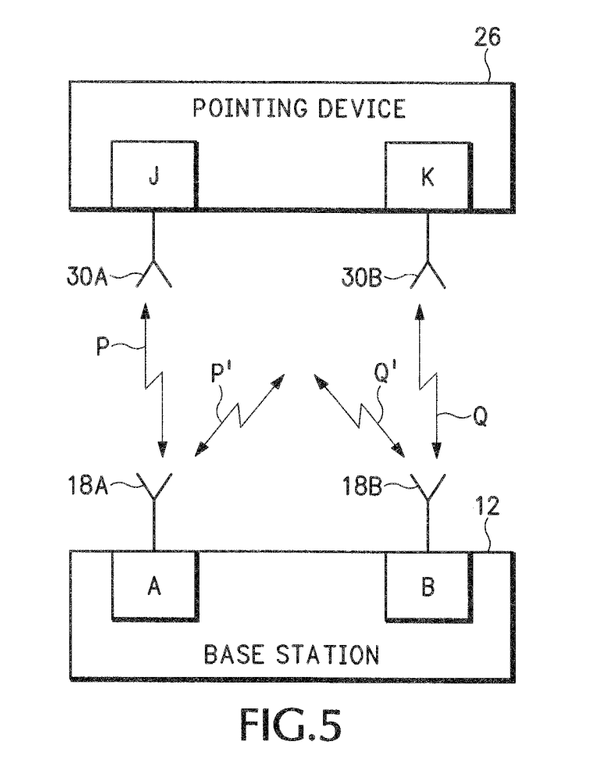
FIG. 5 shows how the ping-pong communication can be performed between each of the antennas in the base station and each of the antennas in the pointing device, according to an embodiment.

Referring to FIG. 5, one way to isolate the pointing device position is to also determine the distance between the antennas for radios A and K (Dak) and the distance between the antennas for radios B and J (Dbj). This is done by having radio B transmit a second pulse or second set of pulses at the frequency responded to by radio J and for radio A to transmit a second pulse or second set of pulses at the frequency responded to by radio K. This allows the base station 12 to calculated four separate circles, or circle radius' as shown in FIG. 6.

In order to determine all four distances Daj, Dak, Dbj and Dbk, for a known, fixed period, radios A and B transmit to radios J and K respectively, generating PRFs P and Q. Radios A and B then swap radio frequencies and transmit to radios K and J, respectively, for a known fixed period, generating PRFs P' and Q'. The values Daj and Dbk are calculated from P and Q, respectively, and the values Dak and Dbj are calculated from P' and Q', respectively. In other words, the frequency of the pulses received from signals P, Q, P' and Q' are used to identify the distances Daj, Dbk, Dak and Dbj. As described above in FIG. 3, the distances Daj, Dbk, Dak and Dbj are calculated according to the frequency of the output signals 44 associated with each of the signals P, Q, P' and Q'.

Figure 6:
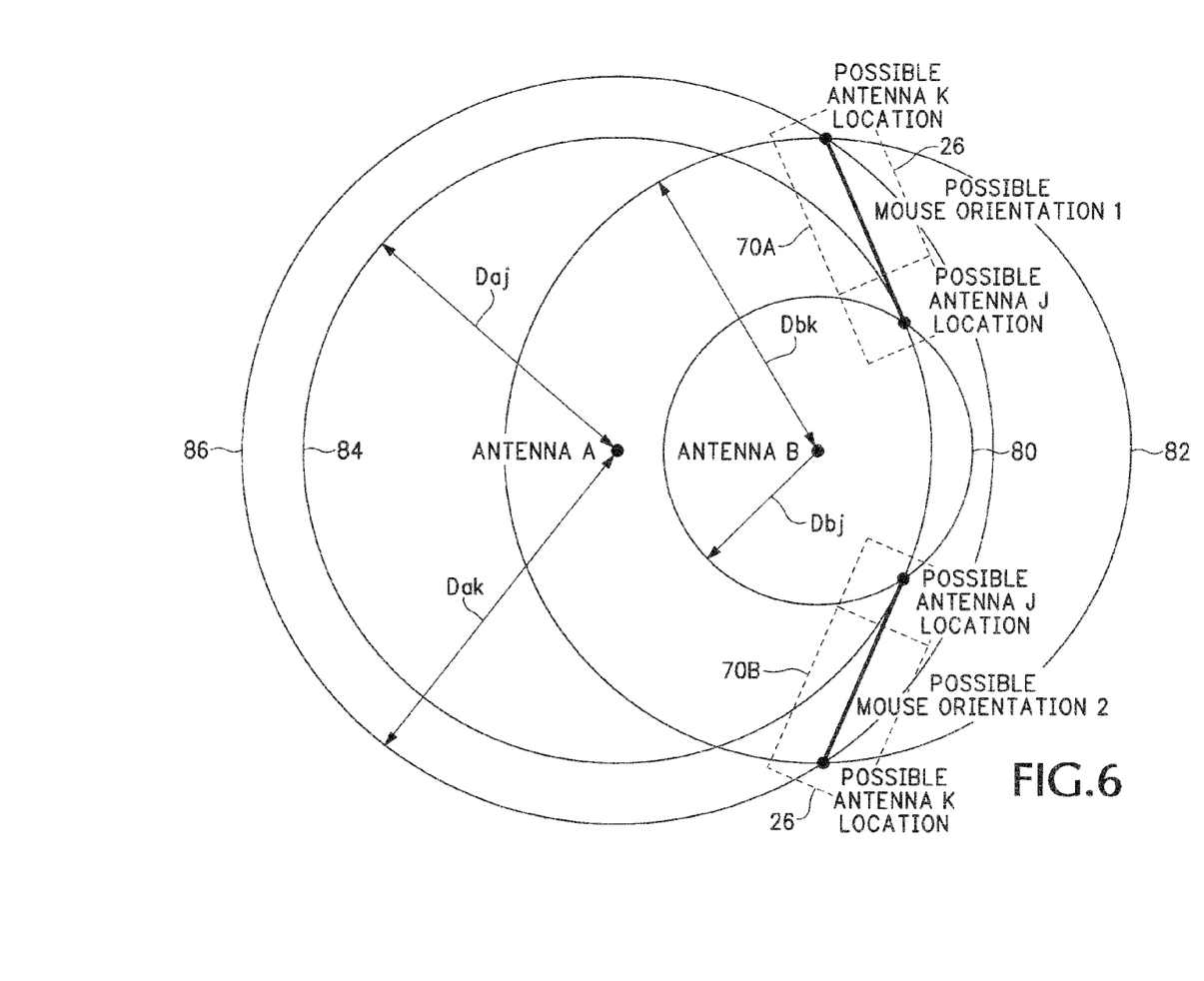
FIG. 6 shows how two mouse locations may be inferred from two pairs of distance measurements, according to an embodiment.

FIG. 6 shows that there are only two possible positions 70A and 70B for the pointing device 26 when distances Daj, Dbk, Dak, and Dbj are calculated. The two positions 70A and 70B include the position of the antenna for radio K at the intersection of circles Dak and Dbk and the position of the antenna for radio J at the intersection of circles Daj and Dbj. The first position 70A and second position 70B are typically widely separated. Thus, one of the two positions 70A and 70B can be inferred from additional detected changes in pointing device movement. In some applications other factors are used to infer which of these locations is correct.

For example, an initialization operation may be used to determine the initial orientation of the pointing device 26. During normal operation it typically may not be necessary to make this additional measurement, since only changes in mouse position and orientation are to be detected. However, it may be prudent to periodically reinitialize in order to insure that the calculated orientation is correct, for example during periods of mouse inactivity.

One possible technique for making this initial position/orientation determination is to add a third antenna A' to the base station 12 that communicates with radio A or B through an electronically controllable switch. The three antenna system is shown in more detail below in FIG. 7. The position of this third antenna A' relative to the other two base station antennas A and B is known. The radio subsystem 14 (FIG. 1) can then determine trigonometrically which of the two possible position/orientations 70A or 70B is actually occupied by the pointing device 26. Once the base station 12 has computed the initial position and orientation of the pointing device 26, the magnitude and direction of pointing device motion is calculated from the changes in frequency of the output signals 44 (FIG. 3) associated with signals P, P', Q and Q' (FIG. 5).

Figure 7:
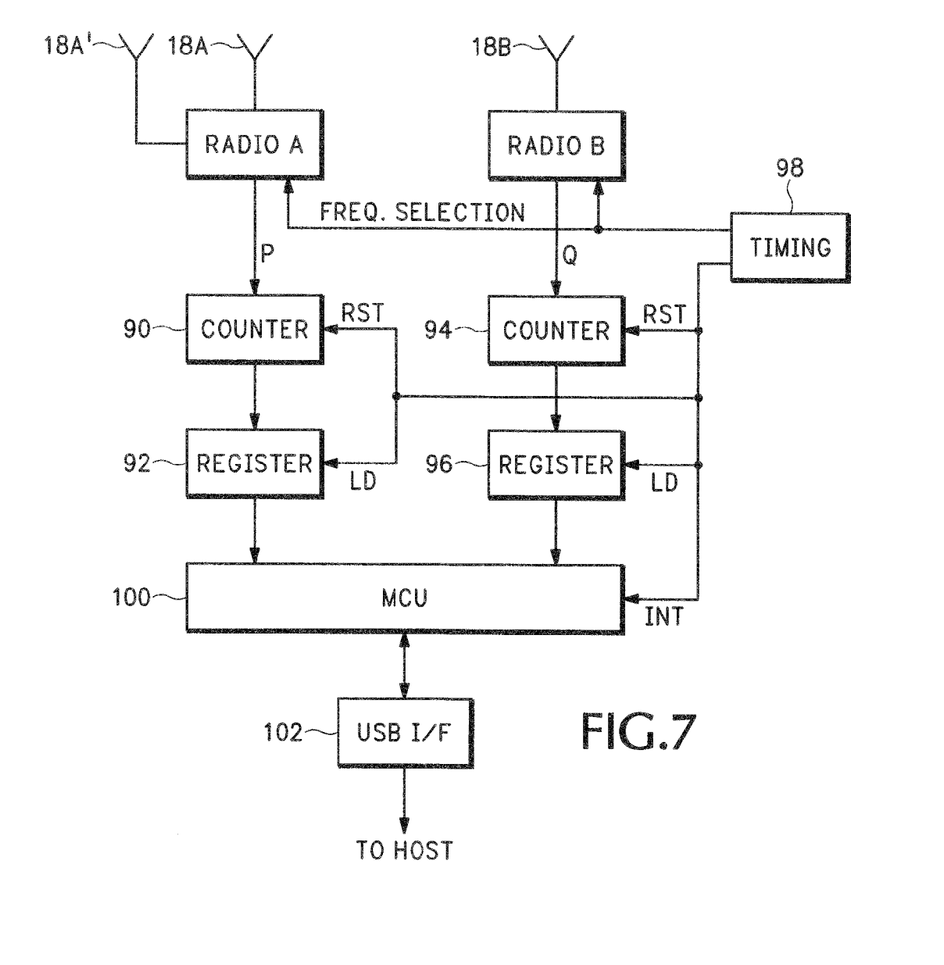
FIG. 7 is a circuit diagram for the base station, according to an embodiment.

FIG. 7 shows in more detail one example of circuitry used in the base station 12 for determining the location of the pointing device 26. The radios A and B are coupled to antennas 18A and 18B, respectively. A third antenna 18A' is coupled to radio A and is used for isolating an initial position of the pointing device 26 as described above. A timing circuit 98 is used for selecting when the pulses are transmitted at the different frequencies associated with signals P, P', Q and Q'.

For some period of time radio A may use a first frequency that is associated with radio J and radio B may use a second frequency that is associated with radio K. After that period of time, the timing circuit 98 notifies radio A to use the second frequency associated with radio K and notifies radio B to use the first frequency associated with radio J. The process then repeats with radio A communicating back with radio J and radio B communicating with radio K.

For example, the signals P and Q in FIG. 5 are transmitted by radios A and B, respectively, during a first time period. The signals P' and Q' are then transmitted by radios A and B, respectively, during a second time period. During a first time interval, the circuitry in radios A and B generate the output signals 44 that have frequencies that are a function of the time delays from signals P and Q and then during a next time interval generates output signals 44 that have frequencies is a function of the time delays from signals P' and Q'.

The number of logic changes or frequency of the output signals 44 generated by radios A and B are counted by counters 90 and 94, respectively, and the results stored in registers 92 and 96, respectively. The registers 92 and 96 are loaded with the count/frequency values from the counters 90 and 94 for each time interval 46 (FIG. 3) and the counters are then reset.

A Microcontroller Unit (MCU) 100 receives the count/frequency values for each time interval. The MCU 100 during a first time interval receives the count/frequency values associated with Daj and Dbk (FIG. 5) and during a second time period receives the count/frequency values associated with Dak and Dbj. From these two sets of count/frequency values, the MCU 100 determines the changes in position for the antenna locations J and K on the pointing device 26 as shown above in FIG. 6. The identified changes in movement of the pointing device 26 in one embodiment is then output from the MCU 100 through a USB interface 102 to a host computer 20 (FIG. 1). In another embodiment, some or all of the position calculations for the pointing device 26 are performed by the host computer 20. In this embodiment, the raw values from registers 92 and 96 may be sent to the host computer 20 via the MCU 100 for further processing.

During initialization, the MCU 100 can read a third set of count/frequency values generated by the third antenna 18A'. The third antenna 18A' may also be used periodically during wireless transmissions to verify which of the locations 70A or 70B in FIG. 6 is actually the location of the pointing device 26. If a three dimensional pointing device movement is implemented, then a third set of antennas are used and a third set of count/frequency values are periodically received by the MCU 100 during a third time interval to identify the elevation z position of the pointing device 26 in addition to the x and y positions.

The equations below describe in more detail the math that may be used in the MCU 100 for identifying the location of the pointing device 26. For example, consider point J on the pointing device 26 to be at x=y=0, and point K to be at x=0, y=−Djk. The circles 80 and 82 in FIG. 6 are centered on point J instead of point B and circles 84 and 86 in FIG. 6 are centered at point K instead of point A. Also, a circle of radius Dab is centered on point A or point B describing the possible orientation of the base station 12 relative to the pointing device 26. This references the pointing device 26 because, in one embodiment, pointing device motion relative to its own center line is identified.

The locus of a circle is $X^2+Y^2=R^2$, where X and Y are the coordinates of the center point of the circle and R is the radius of the circle. Therefore the following equations are solved.

$$Xa^2+Ya^2=Daj^2 \qquad \text{Equations (1)}$$

$$Xb^2+Yb^2=Dbj^2 \qquad \text{Equations (2)}$$

$$Xa^2+(Ya+Djk)^2=Dak^2 \quad \text{Equations (3)}$$

$$Xb^2+(Yb+Djk)^2=Dbk^2 \quad \text{Equations (4)}$$

$$(Xa-Xb)^2+(Ya-Yb)^2=Dab^2 \quad \text{Equations (5)}$$

Equations (6) and (7) are solutions of equations (1)-(5).

$$Ya^2=(Dak^2-Djk^2-Daj^2)/2Djk \quad \text{Equations (6)}$$

$$Yb^2=(Dbk^2-Djk^2-Dbj^2)/2Djk \quad \text{Equations (7)}$$

Equation (6) solves equations (1) and (3) for Ya and equation 7 solves equations (2) and (4) for Yb. Xa can then be found by solving equations (1) and (6) and Xb can be found by solving equations (2) and (7). There may be two solutions for each of Xa, Xb, Ya, Yb because of the squaring function. However, substituting in equation (5) resolves the equations into one set of values for Xa, Xb, Ya, Yb.

There may be some errors in determining Xa, Xb, Ya, Yb since the turn-around time and other constants that contribute to the PRF in addition to the distance are not precisely known. However, any error can be corrected by taking continuous readings of Xa, Xb, Ya, Yb. For example, two readings, Xa and Xa' can be taken to derive dXa=Xa–Xa' so that the imprecision in the Xa and Xa' readings cancel out.

As well as position, a pointing device typically reports the state of buttons, scroll wheels, and other features which are typically found in computer mice. This button state information can be transmitted to the base station 12 from the pointing device 26 using the same radios A, B, J, and K. In one implementation, this is achieved either by providing a short period between the Daj/Dbk-Dak/Dbj measurement switching where the pointing device 26 transmits button state data. In another implementation the pointing device 26 modulates the pulses 40 and 42 (FIG. 2) during normal operation, for example, by inverting some of the pulses between reception and retransmission. The combination of non-inverted and inverted pulses provide digital information representing the button, wheel and other state data generated by the pointing device 26.

In many cases, a single wireless base station 12 is used to communicate with multiple human interfaced devices (HIDs), for example, both a mouse and a keyboard. In one implementation, the base station 12 receives and/or transmits other data to/from other wireless devices, such as keyboard data. These transmissions can be interleaved with the mouse location signaling, in a similar manner as described above for sending pointing device state data.

An example is described to demonstrate the performance that may be achieved using the device and apparatus. In this example a computer mouse is 0.5 meters (m) from the base station 12, and the round-trip time of travel for the pulses in signals P and Q in FIG. 5 is approximately 3.3 nanoseconds (ns). If the radios A, B, J and K are all designed to operate at 2.4 Gigahertz (Ghz), the period of a single cycle pulse is approximately 0.41 ns. It is therefore practical to build radios A, B, J, K so that the total response time does not significantly exceed the round trip time of travel of the pulse signals.

In a further example, using the distance of 0.5 m, a total constant response time of 3.3 ns is assumed. In this case, the PRF is approximately 150 Megahertz (MHz). The output signal 44 in FIG. 3 toggles for each pulse repetition making for an output frequency of 75 MHz. Mice typically report changes in position approximately every 10 ms, therefore P and P' in FIG. 5 would each be counted for approximately 5 ms. Thus in the implementation described above, where frequency change is measured by digital counting, 375000 cycles of the output signal for each of P and P' signals is counted in a 10 ms sampling interval. It is possible to count the number of cycles with a resolution of half a cycle. Therefore, a change in output frequency at P or Q of 1.5 parts per million (ppm) could be detected. As half of the frequency of signals P or Q is attributable to the time of travel, a 3 ppm change in round-trip time is detectable. As the round-trip time is double the distance between the mouse and base station, a 6 ppm change in mouse position is detectable.

Therefore, in the case where the mouse is 0.5 in from the base station 12, and assuming no measurement errors, mouse motion of 3 microns (um) can be detected. This compares with the 31 um resolution of a conventional 800 dpi optical mouse sensor. Thus the radio operated pointing device provides significantly greater resolution than conventional wireless pointing device technology.

For shorter or longer distances between the pointing device 26 and the base station 12, and for different response times in the radios A, B, J and K, the resolution may vary. Additionally, sources of error such as frequency jitter may inject noise into the pointing device measurement. However, the resolution of the radio system described above is more than an order of magnitude better than the conventional optical mouse sensors.

In an alternative embodiment, the base station antennas 18A and 18B may be mounted in a desk-mounted "dongle" or external attachment. A small difference may exist between the plane of the base station antennas 18A and 18B and the plane of movement of the pointing device 26. For example if the base station 12 is incorporated into a laptop computer, slightly above the plane of motion of the pointing device 26, or incorporated in a keyboard that is slightly tilted with respect to the plane of motion of the pointing device 26. This non-planar relationship typically does not significantly affect performance of the pointing device 26.

However, in some cases, the base station 12 may be located well off the plane of motion, for example in a desktop PC enclosure. In this case further antennas and possibly additional radios may be added. Provided that motion of the pointing device 24 remains in one plane, this topology can be accommodated by the use of two antennas for each radio in the base station 12, while retaining just one antenna for each radio in the pointing device 24.

One possible method of detecting mouse movement in this case would be for each base station radio to have two pulse repetition frequency (PRF) outputs, each corresponding to one of its two antennas. Each base station radio would spend alternating periods of time using each of its two antennas, and sending its PRF output to the corresponding antenna. Rather than using two different frequencies for communication with radios J and K, pulses of the same frequency, but opposite phase could be used.

In an alternative implementation, rather than being fixed, the frequencies of the signals P, P', Q and Q' could change or "hop" with each transmission in order to maximize resistance to interference and/or comply with regulatory requirements. In another implementation, a single radio in each of the pointing device 24 and the base station 12 can be switched between multiple antennas. The radios cycle between antennas in order to sequentially determine the distances between each antenna in the base station 12 and each antenna in the pointing device 24. In one implementation of this variant, a single frequency/phase of pulses is used. The base station 12 periodically sends commands to the pointing device 24 to switch antennas. During this synchronization process the pointing device 26 sends information about the state of buttons, scroll wheel, etc. In one embodiment, the sync commands comprise start of frame (SOF) and end of frame (EOF) markers with the phase inverted with respect to the pulses that are used to make the pointing device distance measurements.

In many embodiments, the base station 12 used by a wireless mouse and keyboard is as small as possible. However, multiple antennas may limit the size of the base station 12. Therefore in an alternative implementation, the base station 12 for the pointing device 24 is located within a keyboard 21 (FIG. 1) or within the host computer 20, which have large fixed form factors. In one implementation the keyboard 21 is a "wired" keyboard, which communicates mouse motion to a PC over a Universal Serial Bus (USB) connection. In another implementation, the keyboard 21 is wireless, and wirelessly communicates both mouse and keyboard data to the base station 12 attached to the PC.

In another variation, the mouse 26 and keyboard 21 ping-pong pulses back and forth, but the keyboard does not count the pulses, or calculate mouse location. The pulse counting and location calculations are performed by the PC base station that "listens" for the pulses using a single antenna and also receives mouse and keyboard button data interleaved with bursts of "ping-ponging" pulses.

The implementation proposed is just one of the many methods of measuring time of travel of an electromagnetic signal. However, any other method can be used for detecting the motion of a computer pointing device using time of travel between the pointing device and a base station. The method and apparatus can also be extended to other wireless PC peripherals, including detecting handle motion in joysticks, detecting "tilt" in game pads, or detecting rotational motion in steering wheels.

A third antenna can be added in both the base station and the pointing device to create a 3-Dimensional mouse or game controller, that senses pointer motion in three dimensions. This can also be used in applications such as computer gaming and virtual reality systems. The method and apparatus can also be used to detect movement of pen-like computer input devices. Another embodiment measures the position/motion of a mouse by detecting changes in the frequency of a continuously transmitted RF signal resulting from the Doppler effect.

The wireless system described above enables the development of mice with significantly longer battery life, because the illumination LED and power-hungry optical sensor can be removed from the pointing device. In addition, cost of high quality computer mice is reduced by removing the cost of the optical sensor. The cost of the radio subsystems in the mouse and base station is likely to be similar to that of radios in existing 2.4 Ghz wireless optical mice. Constraints on pointing device form factors imposed by the strict mechanical alignment specified by optical mouse sensors are also eliminated while the also being able to identify pointing device motion more accurately than conventional optical mice.

From the perspective of user's productivity, usage studies have found that mouse users can more accurately control a cursor on a computer screen when the point at which motion is detected is as far forward in the mouse as possible (i.e., furthest from the wrist). By determining the location of point J (FIG. 6) and the angle of the line JK, it is possible it identify any point along the line JK. Thus, even a point further from K than J can be used as a "virtual sensor location".

Figure 8:
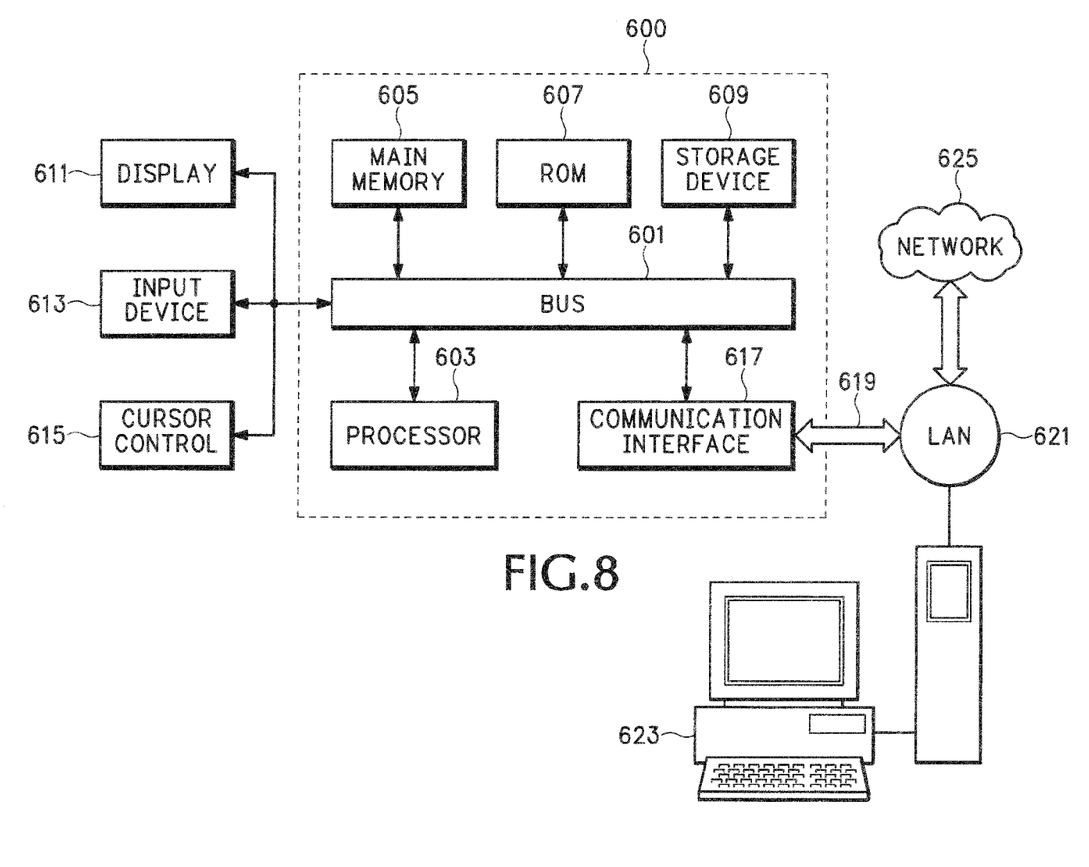
FIG. 8 shows a host computer that can be coupled to the base station, according to an embodiment.

One embodiment of the host 20 shown in FIG. 1 is shown in further detail in FIG. 8. The host computer 20 is shown as a computer system 600 upon which an embodiment according to the present invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, the apparatus and method may be used with or implemented as part of the computer system 600, and the overall system may operate in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are example forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the present invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 605 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of an embodiment may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention that the embodiments have more features than are expressly recited in each claim. Thus, the claims following the detailed description are hereby expressly incorporated into this detailed description, with each claim standing on its own as a separate embodiment of this invention.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

What is claimed is:

1. A method comprising:
   in response to receiving at a computing device a radio signal transmitted from a peripheral device, transmitting a return radio signal from the computing device and changing a state of an output signal;
   identifying time periods for multiple radio signals, including the received radio signal and the return radio signal, to travel between the peripheral device and the computing device; and
   determining a direction of movement of the peripheral device based on a change in the frequency of the output signal, wherein the frequency of the output signal is a function of a distance between the peripheral device and the computing device, and wherein an increasing distance between the peripheral device and the computing device corresponds to a decreasing frequency of the output signal.

2. The method of claim 1, wherein identifying time periods for multiple radio signals to travel between the peripheral device and the computing device further comprises:
   identifying a first time period for at least one radio signal to travel between a first peripheral device antenna and a first computing device antenna; and identifying a second time period for at least another radio signal to travel between a second peripheral device antenna and a second computing device antenna.

3. The method of claim 2, wherein identifying time periods for multiple radio signals to travel between the peripheral device and the computing device further comprises identifying a third time period for at least another radio signal to travel between the first peripheral device antenna and the second computing device antenna, wherein the detecting of the distance and direction of movement of the peripheral device is performed according to the first, second, and third time periods.

4. The method of claim 2, wherein the detecting of the distance and direction of movement of the peripheral device is performed according to the first and second time periods and a fixed distance between the first and second peripheral device antennas.

5. The method of claim 2 further comprises determining a current position of the peripheral device according to a previous position of the peripheral device and the distance and direction of movement of the peripheral device.

6. The method of claim 5 further comprises:
identifying at least one of a third time period for at least another radio signal to travel between the first peripheral device antenna and the second computing device antenna; and
determining the previous position of the peripheral device according to a fixed distance between the first and second peripheral device antennas, and the first, second, and third time periods.

7. The method of claim 1 further comprises presenting a cursor on a display device, wherein movement of the cursor on the display device corresponds to movement of the peripheral device.

8. The method of claim 1 further comprises receiving the multiple radio signals with a transceiving device communicatively coupled to the computing device, wherein the transceiving device is configured to forward data corresponding to the multiple radio signals to the computing device.

9. A system comprising:
circuitry configured to exchange multiple radio signals with a peripheral device by transmitting a return radio signal to the peripheral device and changing a state of an output signal in response to each of one or more received radio signals transmitted from the peripheral device; and
a processing device configured to identify time periods for the multiple radio signals to travel between the circuitry and the peripheral device, wherein the processing device is configured to determine a direction of movement of the peripheral device based on changes in the frequency of the output signal, wherein the frequency of the output signal is a function of a distance between the peripheral device and the circuitry, and wherein an increasing distance between the circuitry and the peripheral device corresponds to a decreasing frequency of an output signal.

10. The system of claim 9, wherein the circuitry includes a first antenna configured to receive at least one radio signal from a first peripheral device antenna, and includes a second antenna configured to receive at least one radio signal from a second peripheral device antenna.

11. The system of claim 10, wherein the processing device is configured to determine the distance and direction of movement of the peripheral device according to a first time delay corresponding to a radio signal received by the first antenna, a second time delay corresponding to a different radio signal received by the second antenna, and a fixed distance between the first and second peripheral device antennas.

12. The system of claim 10, wherein the processing device is configured to determine a current position of the peripheral device according to a previous position of the peripheral device and the distance and direction of movement of the peripheral device.

13. The system of claim 12, wherein, during initialization, the first antenna is configured to receive radio signals from both the first and second peripheral device antennas, and the second antenna is configured to receive radio signals from both the first and second peripheral device antennas, wherein the processing device is configured to determine the previous position of the peripheral device according to a fixed distance between the first and second peripheral device antennas, and time delays associated with three or more of received radio signals.

14. The system of claim 9, wherein the processing device is associated with a host computing device and is configured to generate multiple output signals with state transitions based on reception of corresponding radio signals from the peripheral device, wherein frequency changes in the output signals indicate the distance and direction of movement of the peripheral device.

15. A method comprising:
causing a pointing device to transmit a first radio signal from a first antenna of the pointing device;
identifying a first time period for the first radio signal to travel between the first antenna in the pointing device and a first antenna associated with a computing device;
causing the pointing device to transmit a second radio signal from a second antenna of the pointing device;
identifying a second time period for the second radio signal to travel between the second antenna in the pointing device and a second antenna associated with the computing device; and
determining a distance and direction of movement of the pointing device based on a change in a frequency of an output signal, wherein the change in frequency indicates the distance and direction of movement of the peripheral device, wherein the output signal is generated based on the first and second time periods, wherein the frequency of the output signal is a function of the distance between the first antenna in the pointing device and the first antenna in the computing device, and wherein an increasing distance between the first antenna in the pointing device and the first antenna in the computing device corresponds to a decreasing frequency of the output signal.

16. The method of claim 15, wherein the first and second antennas in the pointing device have a fixed relative position and the first and second antennas associated with the computing device have a fixed relative position, and wherein the determining of the distance and direction of movement of the pointing device is performed according to the first and second time periods and the fixed relative position between the first and second antennas in the pointing device.

17. The method of claim 15 further comprises:
identifying, with the computing device, a third time period for a third radio signal to travel between the first antenna in the pointing device and the second antenna associated with the computing device; and
determining the distance and direction of movement of the pointing device according to the first, second, and third time periods.

18. The method of claim 15 further comprises determining a current position of the pointing device with the computing device according to a previous position of the pointing device and the detected distance and direction of movement of the pointing device.

19. The method of claim 18 further comprises:
- identifying a third time period for a third radio signal to travel between the first antenna in the pointing device and the second antenna associated with the computing device; and
- determining the initial position of the pointing device with the computing device according to a fixed distance of the first and second antennas, and the first, second, and third time periods.

20. The method of claim 18 further comprises:
- identifying a third time period for a third radio signal to travel between the first antenna in the pointing device and a third antenna associated with the computing device; and
- determining the initial position of the pointing device with the computing device according to a fixed distance of the first and second antennas, and the first, second, and third time periods.

\* \* \* \* \*